(12) United States Patent
Roy et al.

(10) Patent No.: US 7,680,451 B2
(45) Date of Patent: Mar. 16, 2010

(54) METHOD AND APPARATUS FOR PROVIDING A MOTION SIGNAL WITH A SOUND SIGNAL USING AN EXISTING SOUND SIGNAL ENCODING FORMAT

(75) Inventors: Philippe Roy, St-Bruno (CA); Bruno Paillard, Sherbrooke (CA)

(73) Assignee: D-Box Technologies Inc., Longueuil, Québec (CA)

( * ) Notice: Subject to any disclaimer, the term of this patent is extended or adjusted under 35 U.S.C. 154(b) by 334 days.

(21) Appl. No.: 11/411,146

(22) Filed: Apr. 26, 2006

(65) Prior Publication Data

US 2006/0256972 A1 Nov. 16, 2006

Related U.S. Application Data

(60) Provisional application No. 60/674,690, filed on Apr. 26, 2005.

(51) Int. Cl.
*H04H 40/00* (2008.01)
(52) U.S. Cl. .................. 455/3.06; 455/3.01; 348/460; 348/461; 348/462; 348/464; 463/30; 472/59; 704/503; 704/504
(58) Field of Classification Search ......... 386/100–117, 386/123–124, 46, 52; 704/500–504, E19.039; 348/407.1, 460–464, 484, E7.024; 463/30–35; 472/57, 59, 64, 65; 455/3.01, 3.06; 700/86–89, 700/94
See application file for complete search history.

(56) References Cited

U.S. PATENT DOCUMENTS

| 5,712,920 | A | 1/1998 | Spille |
| 5,745,643 | A | 4/1998 | Mishina |
| 6,525,775 | B1 | 2/2003 | Kahn et al. |
| 6,584,125 | B1 | 6/2003 | Katto |
| 6,690,881 | B1 * | 2/2004 | Tomita et al. ............... 386/117 |
| 7,236,688 | B2 * | 6/2007 | Honjo ........................ 386/109 |

FOREIGN PATENT DOCUMENTS

| EP | 0903940 | 3/1999 |
| JP | 03016077 | 1/1991 |
| JP | 2000324466 | 11/2000 |

* cited by examiner

*Primary Examiner*—Tuan A Tran
(74) *Attorney, Agent, or Firm*—Ogilvy Renault LLP

(57) ABSTRACT

A method for providing a motion signal with a sound signal using an existing sound signal encoding format. The method comprises providing the motion signal, providing the sound signal, inserting the motion signal in an available data field provided in the existing encoding algorithm, encoding the sound signal with the inserted motion signal according to the existing encoding algorithm to generate an encoded bitstream sound signal and providing the encoded bitstream sound signal comprising the motion signal and the sound signal.

17 Claims, 5 Drawing Sheets

METHOD AND APPARATUS FOR PROVIDING A MOTION SIGNAL WITH A SOUND SIGNAL USING AN EXISTING SOUND SIGNAL ENCODING FORMAT

CROSS-REFERENCE TO RELATED APPLICATIONS

This patent application claims priority on U.S. provisional patent application No. 60/674,690 entitled "Method and apparatus for providing a motion signal with a sound signal using an existing sound signal encoding format" that was filed Apr. 26, 2005, the specification of which is hereby incorporated by reference.

TECHNICAL FIELD

This invention pertains to the field of encoding formats. In particular, this invention relates to the encoding of motion and sound signals in a bitstream.

BACKGROUND OF THE INVENTION

Various standards have been created for providing a sound signal to a user. For instance, Dolby has created some popular encoding standards such as AC3 for providing an encoded sound signal (also referred to as an encoded bitstream sound signal) to a plurality of users. Various other standards such as MP3, DTS, MPEG and ATRAC have also been developed.

In the mean time, actuators have been developed in order to provide haptic movements to a user. The actuators provide haptic movements synchronized with a corresponding motion signal. Such actuators are disclosed in U.S. Pat. No. 6,662,560. The skilled addressee will appreciate that in the case where the actuators are used while viewing a movie, it is desirable that the video track, the bitstream sound signal and the motion signal are all synchronized to provide realism to the user.

Unfortunately, it will be appreciated that in prior art embodiments, the motion signals are not provided in the a single storage device together with the bitstream sound signal and the video track, which is cumbersome for a user as it requires the user to have a first storage device for storing the bitstream sound signal and the video track as well as a second storage device for the motion signals.

There is a need for a method and apparatus that will overcome at least one of the above-identified drawbacks.

SUMMARY OF THE INVENTION

According to an aspect of the invention, there is provided a method for providing a motion signal with a sound signal using an existing sound signal encoding format, the method comprising providing the motion signal, providing the sound signal, inserting the motion signal in an available data field provided in the existing encoding format, encoding the sound signal with the inserted motion signal according to the existing encoding format to generate a composite audio/motion signal and providing the composite audio/motion signal comprising the motion signal and the sound signal.

According to another aspect of the invention, there is provided an apparatus for providing a motion signal with a sound signal using an existing sound signal encoding format, the apparatus comprising a motion signal providing unit for providing the motion signal, a sound signal providing unit for providing the sound signal, an available data field selection unit for providing an available data field selection signal in the existing sound signal encoding format, an encoding unit for receiving the provided motion signal, the provided sound signal, the available data field selection signal, and for inserting the motion signal in the available data field and for encoding the sound signal with the inserted motion signal according to the existing encoding format to generate a composite audio/motion signal and a composite audio/motion signal providing unit for providing the generated composite audio/motion signal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
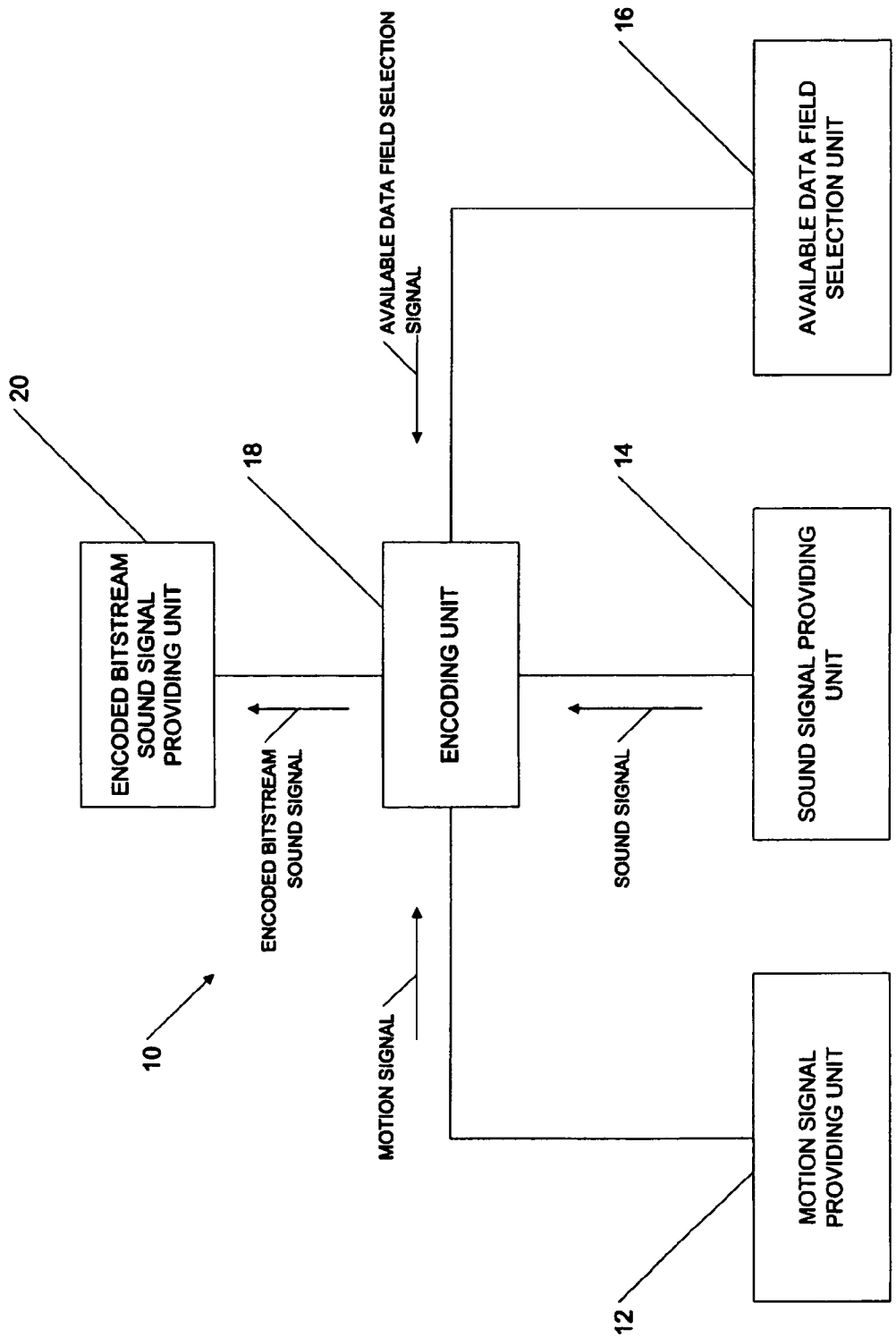
FIG. 1 is a block diagram which shows an embodiment of an apparatus for providing a motion signal with a sound signal using an existing sound signal encoding format; the apparatus comprises, inter alia, an encoding unit, a motion signal providing unit, a sound signal providing unit and an available data field selection unit.

Now referring to FIG. 1, there is shown an embodiment of an apparatus 10 for providing a composite audio/motion signal according to one embodiment of the invention.

The apparatus 10 comprises a motion signal providing unit 12, a sound signal providing unit 14, an available data field selection unit 16, an encoding unit 18 and a composite audio/motion signal providing unit 20.

The motion signal providing unit 12 is adapted to provide a motion signal. It will be appreciated that the motion signal comprises an indication of a movement to perform on at least one actuator. In an embodiment, the motion signal comprises a plurality of bits indicative of the movement to perform on the at least one actuator. The skilled addressee will further appreciate that the movement to generate on the at least one actuator may be synchronized with a sound signal. Such motion signal may be advantageously used when viewing a movie for instance.

In an embodiment, the motion signal providing unit 12 comprises a storing medium comprising a motion signal which has been programmed to be played with a corresponding sound signal of a given video signal. In an embodiment, the storing medium of the motion signal providing unit may be a hard disk, a CD, a DVD, a solid-state flash-based storage medium such as memory stick, a SD-card, a computer file in a computer or the like.

The sound signal providing unit 14 is adapted to provide a sound signal. It should be appreciated that the sound signal providing unit 14 may provide a sound signal which is not already encoded as well as a sound signal which is already encoded using an existing sound signal encoding format. In an embodiment, the sound signal provided is encoded according to an encoding format which is compatible with the IEC61937 standard, an example of which is the AC3 standard of Dolby™. In an embodiment, the sound signal providing unit is a sound file located on a storing medium such as a hard disk, a CD, a DVD or the like.

It will be appreciated that in an embodiment, the sound signal providing unit 14 may be any unit capable of providing such sound signal coded according to the existing encoding format or standard referred to as "AC3".

The available data field selection unit 16 is adapted to provide an indication of an available data field in the existing encoding format. It will be appreciated that provisions for available data fields have been incorporated in various existing encoding formats such as AC3. More precisely, it has been contemplated for AC3 to provide an available data field which is referred to as "auxdata". "ATSC Standard: Digital Audio Compression (AC3), Revision A, Doc A/52A (20 Aug. 2001)", published by Advanced Television Systems Committee, 1750 K Street, N.W., suite 1200, Washington D.C. 20006, and hereby incorporated by reference, discloses such "auxdata".

The encoding unit 18 is adapted to receive a motion signal to encode in the available data field of a bitstream sound signal generated according to the existing encoding format. The encoding unit 18 is further adapted to provide a composite audio/motion signal to the composite audio/motion signal providing unit 20. It will be appreciated that the encoding unit 18 may be any processor suitable for performing such tasks. In an embodiment, the encoding unit 18 is an application running on a computer.

It will be further appreciated that the composite audio/motion signal providing unit 20 may be any device suitable for providing the composite audio/motion signal, for instance, the composite audio/motion signal providing unit 20 may be a medium comprising the encoded bitstream sound signal such as a CD-ROM, a DVD-ROM or the like. Alternatively, the composite audio/motion signal providing unit 20 may be a communication unit adapted to provide the composite audio/motion signal to a plurality of users. For instance, it will be appreciated that the communication unit may be adapted to provide the composite audio/motion signal over a network which may be wireless, such as a television network, or wired such as a local area network (LAN), a metropolitan area network (MAN) or a wide area network (WAN) such as the Internet.

More precisely, the motion signal providing unit 22 provides a motion signal to the encoding unit 18.

The sound signal providing unit 14 provides a sound signal to the encoding unit 18 and the available data field selection unit 16 provides an available data field selection signal to the encoding unit 18. The encoding unit 18 encodes the motion signal provided by the motion signal providing unit 12 with the sound signal provided by the sound signal providing unit 14 in the available data field selection signal provided by the available data field selection unit 16.

The encoding unit 18 further provides a composite audio/motion signal to the composite audio/motion signal providing unit 20.

Figure 2:
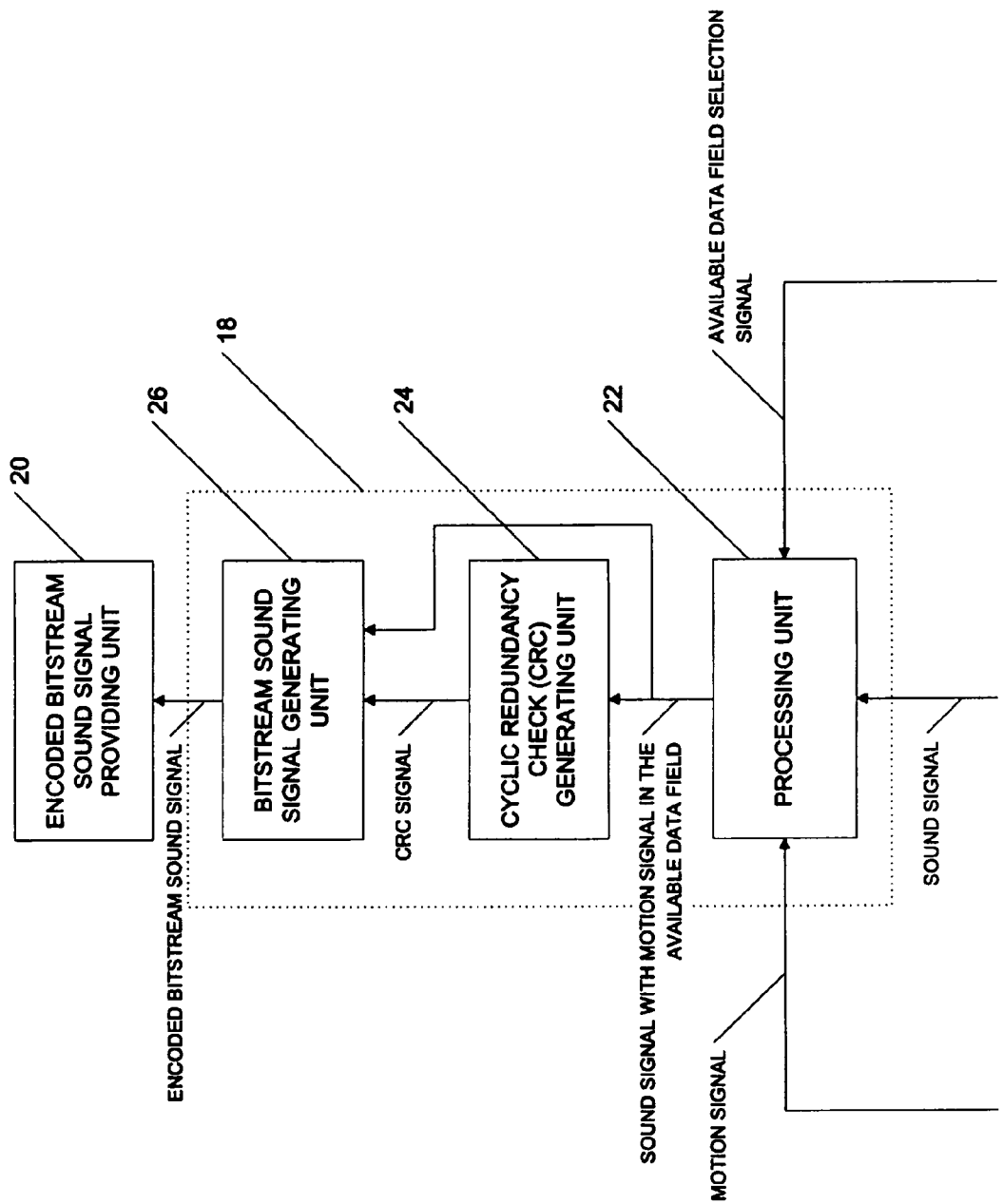
FIG. 2 is a block diagram which shows an embodiment of the encoding unit of the apparatus for providing a motion signal with a sound signal using an existing sound signal encoding format according to one embodiment of the invention; the encoding unit comprises a processing unit 22, a cyclic redundancy check (CRC) generating unit and an encoded bitstream sound signal generating unit.

Now referring to FIG. 2, there is shown an embodiment of the encoding unit 18.

The encoding unit 18 comprises a processing unit 22, a cyclic redundancy check generating unit 24 and a sound signal generating unit 26.

More precisely, the processing unit 22 receives the motion signal, the sound signal and the available data field selection signal. The encoding unit 22 encodes the motion signal with the sound signal using the available data field selection signal and provides a sound signal with the motion signal inserted in the available data field. The cyclic redundancy check generation unit 24 receives the sound signal with the motion signal inserted in the available data field.

The cyclic redundancy check generating unit 24 generates a CRC signal indicative of the CRC of the sound signal with the motion signal inserted in the available data field. The CRC signal is provided by the cyclic redundancy check generating unit 24 to the composite audio/motion signal generating unit 26. The composite audio/motion signal generating unit 26 further receives the sound signal with the motion signal in the available data field.

The composite audio/motion signal generating unit 26 generates a composite audio/motion signal which is provided to the composite audio/motion signal providing unit 20.

Figure 3:
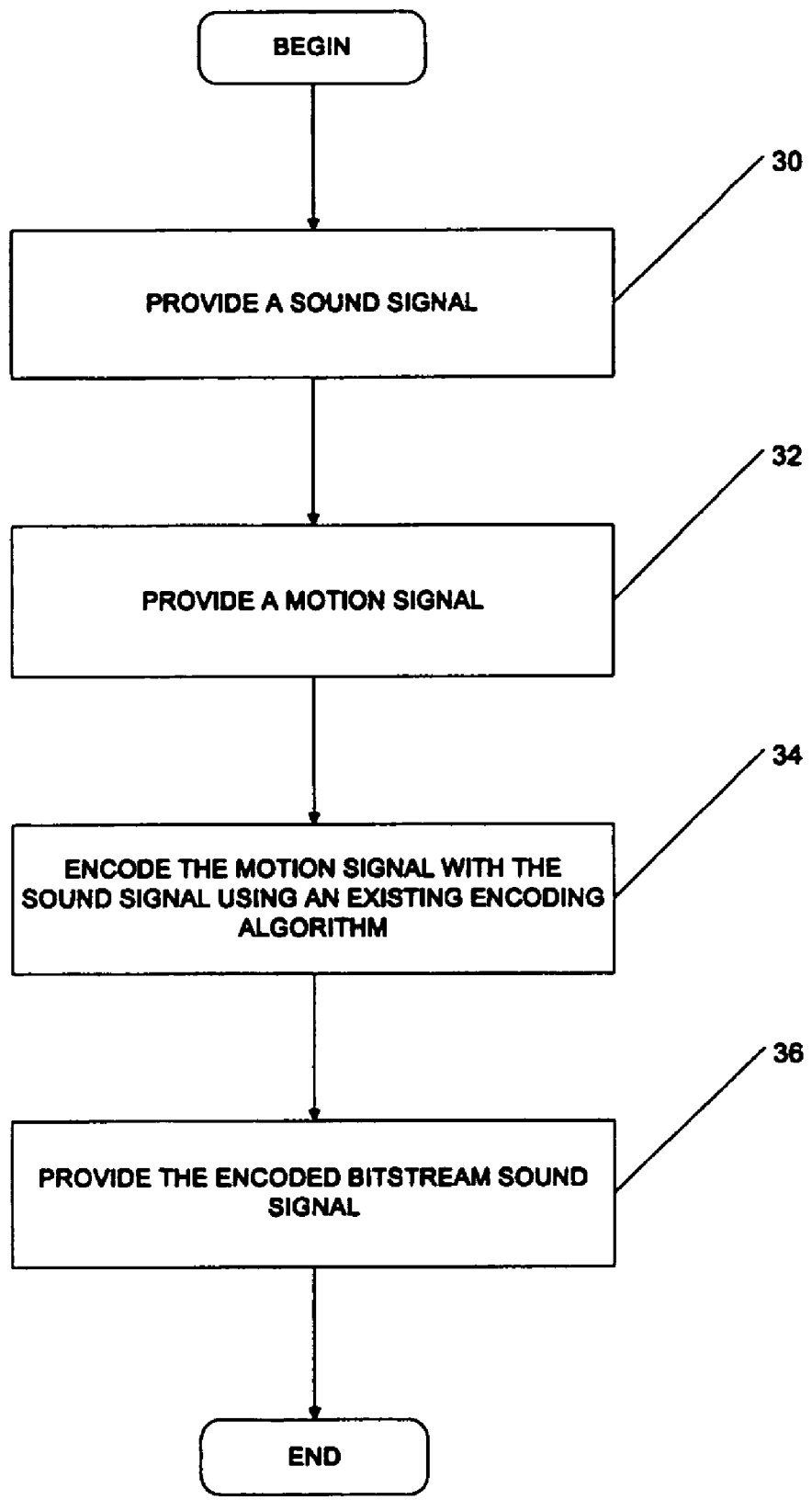
FIG. 3 is a flow chart which shows how the apparatus for providing a motion signal with a sound signal using an existing sound signal encoding format operates according to one embodiment of the invention; according to one step, a motion signal is encoded with the sound signal using an existing encoding format.

Now referring to FIG. 3, there is shown an embodiment for providing the composite audio/motion signal according to one embodiment of the invention.

According to step 30, a sound signal is provided. In an embodiment, the sound signal 30 is provided by the sound signal providing unit 14.

According to step 32, a motion signal is provided. The motion signal is provided by the motion signal providing unit 12 in an embodiment. In an embodiment, the motion signal may be in the D-Box Technologies proprietary format described in U.S. Pat. No. 6,659,773 or co-pending U.S. patent application Ser. No. 10/844,457 which are hereby incorporated by reference.

According to step 34, the motion signal is encoded with the bitstream sound signal using an existing encoding format having an available data field.

According to step 36, the composite audio/motion signal is provided. In an embodiment, the composite audio/motion signal is provided by the composite audio/motion signal providing unit 20.

It will be appreciated that the composite audio/motion signal may be provided to users directly or indirectly. For instance the composite audio/motion signal may be provided to the users via storing means such as DVD, CD or the like. Alternatively, the composite audio/motion signal may be provided to the users using a wire/wireless transmission using a network. The skilled addressee will appreciate that a broad range of ways to provide the composite audio/motion signal may be used.

Figure 4:
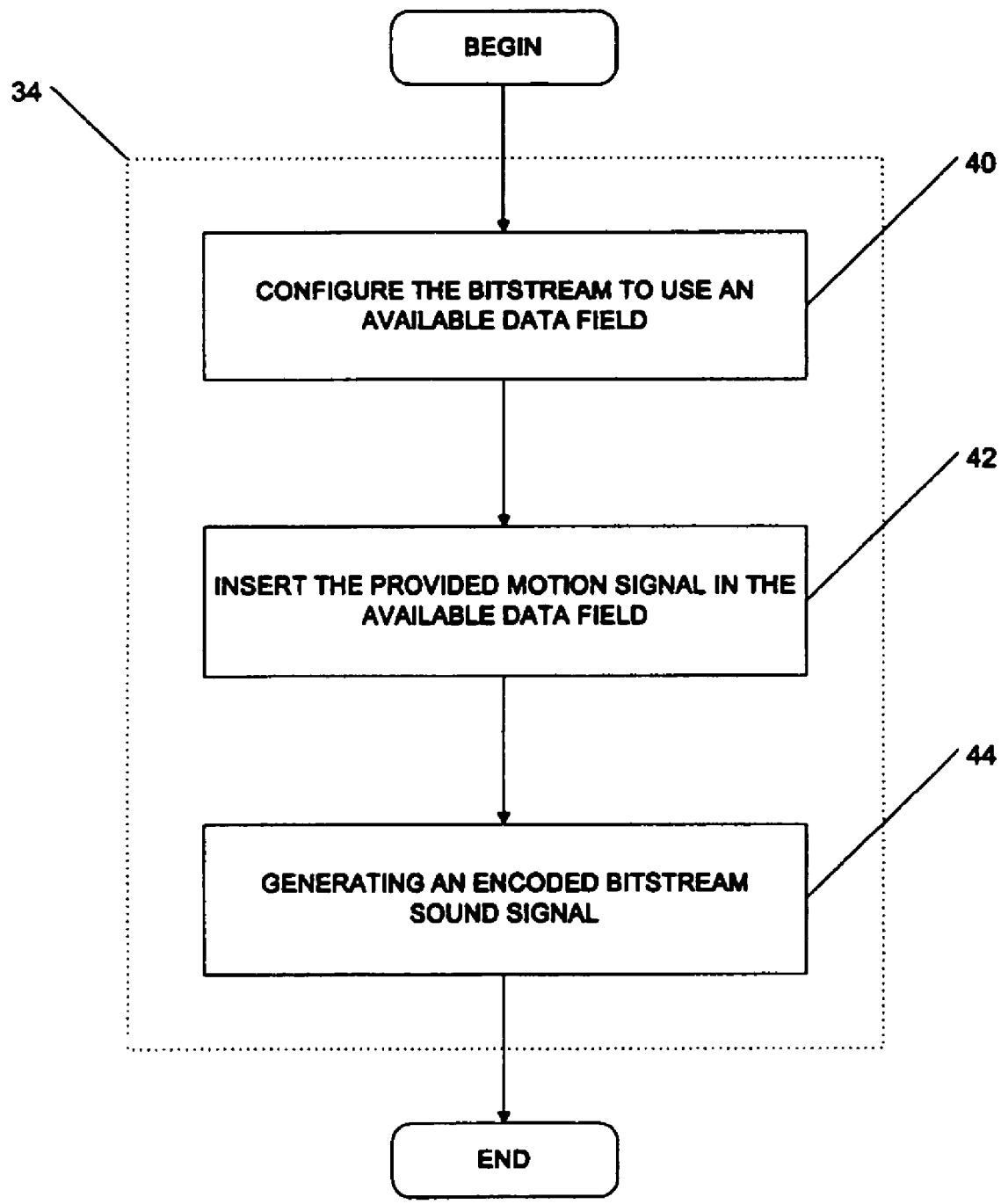
FIG. 4 is a flow chart which shows how the motion signal is encoded with the sound signal using an existing encoding format according to one embodiment of the invention; according to one step, a composite audio/motion signal is generated.

Now referring to FIG. 4, there is shown an embodiment which shows how the motion signal is encoded with the sound signal using an existing encoding format having an available data field.

According to step 40, the bitstream is configured to use the available data field with sound signal. It will be appreciated as explained earlier that there might be provision in a standard for leaving available data fields in a bitstream. It will be appreciated that in order to use the available data field and remains in compliance with the encoding format, it might be required to configure particular bits in the bitstream.

In the embodiment where the encoding protocol is AC3, the configuration comprises formatting the motion signal according to a proprietary encoding standard so it may be recognized, decoded and properly synchronized. Original bitstream parameters may also be modified to indicate that extra data is inserted therein.

According to step 42, the provided motion signal is inserted in the available data field. The skilled addressee will appreciate that, prior to being inserted in the available data field, the provided motion signal may be compressed. Alternatively, no compression is performed.

In an embodiment, the motion signal is compressed.

It will be appreciated that the sound signal as well as the motion signal may be encoded in order to efficiently use the bandwidth available. In fact, the available number of bits in a bitstream may only be modified by fixed increments in one embodiment, such as in AC3. Encoders then encode the sound signal in order to use the available bandwidth. It will be appreciated that there might be a loss of bandwidth due to the fact that the encoding is performed at a given bandwidth and due further to the fact that the motion signal may only use a limited amount of the available bandwidth for encoding the motion signal. Accordingly, a combined encoding unit for encoding both the motion signal and the sound signal may be advantageously used in order to use all available bandwidth.

It will be appreciated that in the case where there is no "auxdata" field, it may be possible to modify the audio stream in order to insert the motion signal in a way that allows a motion decoder to recognize its presence and decode it, while still allowing the audio player to decode the sound signal, and minimize the impact of the modification on perceived audio.

According to step 44, a composite audio/motion signal is generated. In an embodiment, the composite audio/motion signal is generated by the composite audio/motion signal generating unit 26.

Figure 5:
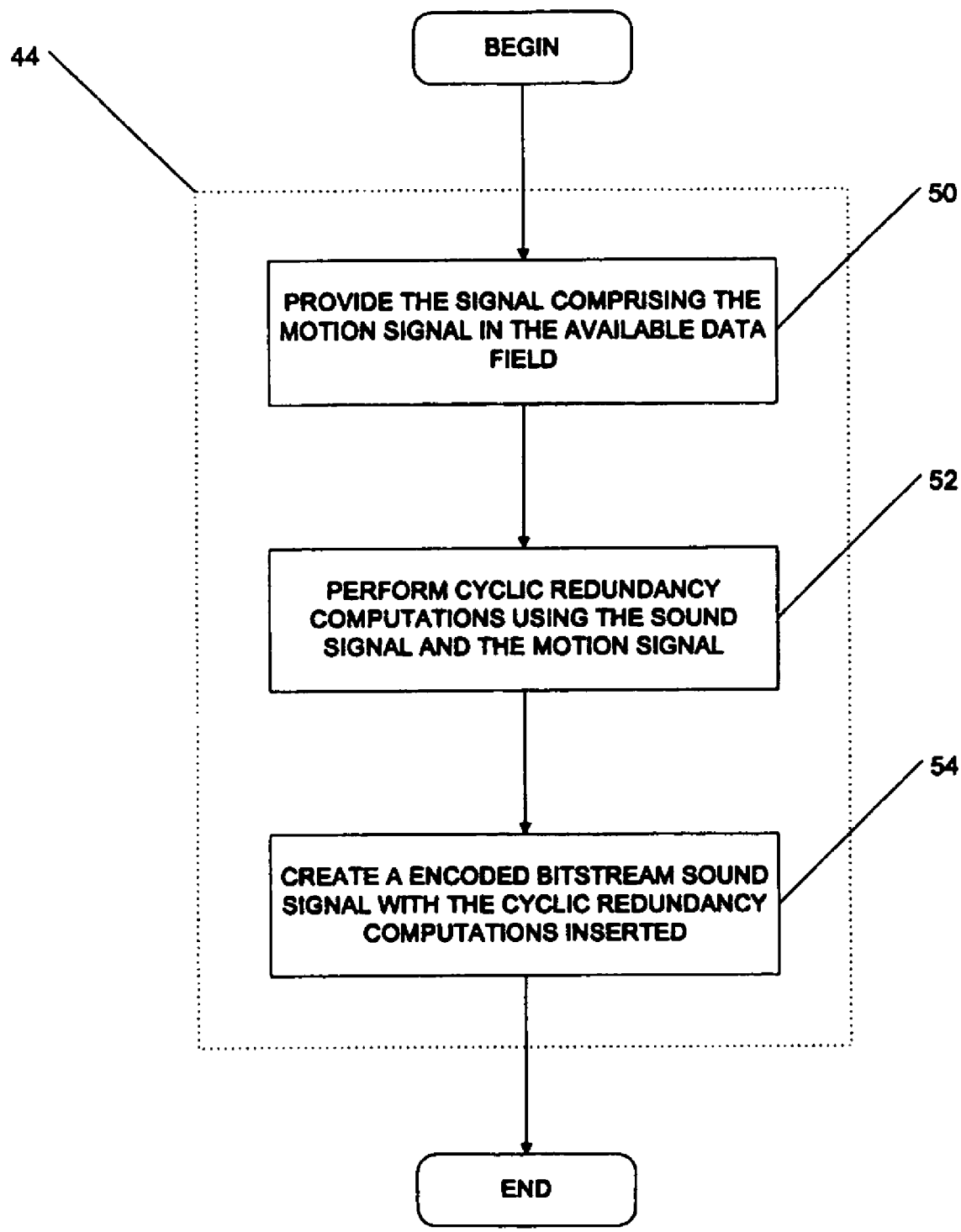
FIG. 5 is a flow chart which shows how the composite audio/motion signal is generated according to one embodiment of the invention. According to a first step, the signal comprising the motion signal is provided in the available data field; according to a second step cyclic redundancy computations are performed and according to a third step a composite audio/motion signal is created.

Now referring to FIG. 5, there is shown an embodiment which shows how the generating of a composite audio/motion signal is performed.

According to step 50, the signal comprising the motion signal is provided in the available data field. In an embodiment, the signal comprising the motion signal is provided in the available data field using the encoding unit 22.

According to step 52, a cyclic redundancy computation is performed using the sound signal and the motion signal inserted inside the available data field. In an embodiment, the cyclic redundancy computations are performed using the cyclic redundancy check generating unit 24.

According to step 54, a composite audio/motion signal is created with the cyclic redundancy computation inserted therein. In an embodiment, the composite audio/motion signal is created with the cyclic redundancy computation inserted therein using the bitstream sound signal providing unit 26.

In fact, it will be appreciated that the disclosed apparatus enables the provision of the motion signal without requiring a user to change his current decoding unit operating according to the existing algorithm. In the case where the user desires to use the motion signal, the skilled addressee will appreciate that a further decoding unit may be used to extract the inserted motion signal.

As a consequence, it may be therefore possible to distribute a composite audio/motion signal to a large plurality of users in which only a limited number has a decoding unit for decoding the inserted motion signal which therefore avoids having to prepare dedicated motion signal storing units.

Also, it will be appreciated that by inserting the motion signal in a given available data field of the sound signal bitstream, it is further possible to achieve a synchronization between the motion signal and the sound signal as the motion signal will be delivered at a given bit rate.

In the case where there is more processing time required for extracting and handling the motion signal, it will be appreciated that the motion signal may be provided in advance with respect to the sound signal in order to achieve synchronization with the sound signal.

Also it should be further appreciated that in the case where only a limited bit rate may be provided to the user, such as in the case of DVDs, it may be desirable to use a lower bit rate for encoding the sound signal in order to ensure a sufficient bit rate for inserting the motion signal.

It will be appreciated that a decoder unit may be provided to decode a received composite audio/motion signal which has been created according to the method disclosed above. Such decoder unit may be implemented in hardware as well as in software and may run on a processing unit.

The placement of the sound signal data within the AC3 frame according to an embodiment will now be discussed. The sound signal data is inserted at the end of the AC3 frame, within the auxiliary data field. Before the insertion, the layout of the frame is as shown in Table 1 below.

TABLE 1

| | |
|---|---|
| syncword | 16-bit field. This is the first word of the AC3 stream. Its value must be 0x0B77. |
| crc1 | 16-bit field. Represents the CRC for the first 3/5 of the frame. |
| Fscod | 2-bit field. Represents the sampling rate code. It is usually 00 for aDVD, indicating 48 kHz sampling rate. |
| Frmsizecod | 6-bit field. Represents the size of the frame. The frame size in wordsis a function of this value, as well as the fscod field. |
| ... | ... AC3 data |
| End of block 5 mantissas | This is the end of the AC3 data proper. |
| padding | Since the frame size can only take discrete values there may be padding between the last mantissa of block 5, and the beginning of the auxiliary data. |
| auxbits | Auxiliary data bit field. This field is auxdatal-bit long, and the bits are packed towards the end of the frame. |
| auxdatal | 14-bit field. If auxdatae is true, then auxdatal exists and indicates the number of bits in the auxiliary data field. |
| auxdatae 1-bit field. | Indicates if auxiliary data is present in the stream. |
| crcrsv 1-bit field. | May be adjusted so that the crc2 field is not equal to the "0x0B77" word. |
| crc2 | 16-bit field. Represents the CRC for the whole frame. |

Note that the auxdatal, auxbits and padding do not necessarily exist. In most cases, the end of the block 5 mantissas is placed just before the auxdatae field, which in this case is set to false (no auxiliary data).

The sound signal data block is simply inserted at the end of the normal AC3 frame, after the frame size has been increased sufficiently to contain all of it. After insertion of the sound signal data block, the AC3 frame is modified as shown in Table 2 below (modified fields are in bold).

TABLE 2

| | |
|---|---|
| syncword 16-bit field. | This is the first word of the AC3 stream. Its value must be 0x0B77. |
| crc1 16-bit field. | Represents the CRC for the first 3/5 of the frame. |
| fscod 2-bit field. | Represents the sampling rate code. It is usually 00 for a DVD, indicating 48 kHz sampling rate. |
| frmsizecod | 6-bit field. Represents the size of the frame. The frame size in words is a function of this value, as well as the fscod field. This value is incremented to give sufficient room for the Sound signal data block. |
| . . . | . . . AC3 data |
| End of block 5 mantissas | This is the end of the AC3 data proper. |
| (old) padding | Since the frame size can only take discrete values there may be padding between the last mantissa of block 5, and the beginning of the auxiliary data. |
| (old) auxbits | Auxiliary data bit field. This field is auxdatal-bit long, and the bits are packed towards the end of the frame. |
| (old) auxdatal | 14-bit field. If auxdatae is true, then auxdatal exists and indicates the number of bits in the auxiliary data field. |
| (old) auxdatae | 1-bit field. Indicates if auxiliary data is present in the stream. |
| (old) crcrsv | 1-bit field. May be adjusted so that the crc2 field is not equal to the "0x0B77" word. |
| (old) crc2 | 16-bit field. Represents the CRC for the whole frame. |
| padding | This padding is added because the new frame size is generally too large for the sound signal data block |
| auxbits | This field contains the sound signal data block proper. This field is auxdatal-bit long, and the bits are packed towards the end of the frame. |
| auxdatal | 14-bit field. auxdatal indicates the number of bits in the sound signal data block. |
| auxdatae | 1-bit field. This bit is set to 1 to indicate the presence of the sound signal data block. |
| Crcrsv | 1-bit field. May be adjusted so that the crc2 field is not equal to the "0x0B77" word. |
| crc2 | 16-bit field. Represents the CRC for the whole frame, with the sound signal data block inserted. |

Because it is not known in advance if the AC3 frame already has space for an auxiliary data field, and also because this may change from frame to frame, no assumption is made on this.

The frame size is increased to give room for the sound signal data block, as well as the auxdatal, auxdatae and new CRC2 fields.

The frmsizecod field is modified to reflect the new increased frame size.

The sound signal data block is simply placed at the end of a legitimate AC3 frame. The old CRC2, crcrsv, auxdatae fields, as well as the auxdatal and auxbits fields, if they exist, are not removed. In effect, they become padding for the new frame.

The sound signal data block is padded at the front so that the size of the complete frame is equal to the new increased frame size. The Sound signal data block and its padding are placed immediately after the old crc2 field. The Sound signal data block becomes the new auxbits field.

An auxdatal field is placed after the sound signal data block. The auxbitl value is equal to the number of bits in the sound signal data block (Sound signal block size×16).

An auxdatae field is placed after the auxdatal field. This field has a value of 1 (true).

A new CRC is placed at the end of the frame.

While illustrated in the block diagrams as groups of discrete components communicating with each other via distinct data signal connections, it will be understood by those skilled in the art that the embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, a computer readable medium or an electrical or electro-magnetical signal.

The embodiments of the invention described above are intended to be exemplary only. The scope of the invention is therefore intended to be limited solely by the scope of the appended claims.

We claim:

1. A method for providing a motion signal with a sound signal using an existing sound signal encoding format, said method comprising:
    providing said motion signal;
    providing said sound signal;
    inserting said motion signal in an available data field provided in said existing encoding format;
    encoding said sound signal with the inserted motion signal according to said existing encoding format to generate a composite audio/motion signal; and
    providing said composite audio/motion signal to (1) an actuator system whereby haptic movements are performed by at least one actuator as a function of said motion signal, and to (2) a sound output to produce sounds as a function of said sound signal, said sounds being synchronized with said haptic movements.

2. The method as claimed in claim 1, wherein providing said sound signal comprises providing said sound signal not encoded.

3. The method as claimed in claim 1, wherein encoding said sound signal comprises using an encoding format which is compatible with the IEC61937 standard as said existing encoding format.

4. The method as claimed in claim 3, wherein encoding said sound signal comprises using Audio Coding 3 (AC3), further wherein said provided sound signal is encoded using Audio Coding 3 (AC3).

5. The method as claimed in claim 4, wherein inserting said motion signal comprises using "auxdata" as said available data field.

6. The method as claimed in claim 5, wherein encoding said sound signal comprises performing cyclic redundancy computations using said sound signal and said motion signal and further encoding said sound signal with the inserted motion signal using the performed cyclic redundancy computations.

7. The method as claimed in claim 1, wherein providing said motion signal comprises using a storing medium.

8. The method as claimed in claim 7, wherein providing said motion signal comprises using said storing medium as selected from a group consisting of hard disk, compact disk (CD), digital versatile disk (DVD), solid-state flash-based storage medium such as memory stick, and SD-card.

9. A combination of an apparatus for providing a motion signal with a sound signal using an existing sound signal encoding format, an actuator system and a sound output, wherein:

said apparatus comprises a motion signal providing unit for providing said motion signal, a sound signal providing unit for providing said sound signal, an available data field selection unit for providing an available data field selection signal in said existing sound signal encoding format, an encoding unit for receiving said motion signal, said sound signal, said available data field selection signal, and for inserting said motion signal in said available data field and for encoding said sound signal with the inserted motion signal according to said existing encoding format to generate a composite audio/motion signal, and a composite audio/motion signal providing unit for providing said generated composite audio/motion signal;

an actuator system for producing haptic movements of at least one actuator from said generated composite audio/motion signal; and a sound output for producing sounds from said generated composite audio/motion signal in synchronization with said haptic movements.

10. The combination as claimed in claim 9, wherein said motion signal providing unit comprises a storing medium.

11. The combination as claimed in claim 10, wherein said storing medium comprises at least one of a hard disk, a compact disk (CD), a digital versatile disk (DVD), a solid-state flash-based storage medium such as memory stick, and a SD-card.

12. The combination as claimed in claim 9, wherein said sound signal providing unit comprises a sound file stored on at least one of a hard disk, a compact disk (CD) and a digital versatile disk (DVD).

13. The combination as claimed in claim 9, wherein said existing encoding format comprises an encoding format which is compatible with the IEC61937 standard.

14. The combination as claimed in claim 13, wherein said existing sound signal encoding format is Audio Coding 3 (AC3).

15. The combination as claimed in claim 14, wherein said available data field is "auxdata".

16. The combination as claimed in claim 15, wherein said encoding unit comprises a processing unit for receiving said provided motion signal, said provided sound signal and said available data field selection signal and for generating a sound signal with said motion signal inserted in said available data field; wherein said encoding unit further comprises a cyclic redundancy check (CRC) generating unit for receiving said generated sound signal with said motion signal inserted in said available data field and for providing a cyclic redundancy check signal and further wherein said encoding unit comprises a composite audio/motion signal generating unit for receiving said cyclic redundancy check signal and said generated sound signal with said motion signal inserted in said available data field and for providing said composite audio/motion signal.

17. The combination as claimed in claim 9, wherein said composite audio/motion signal providing unit comprises one of a medium for storing said composite audio/motion signal and a communication unit for providing said composite audio/motion signal to a remote user.

\* \* \* \* \*